US012709159B2

(12) United States Patent
Theodosakis et al.

(10) Patent No.: US 12,709,159 B2
(45) Date of Patent: Aug. 18, 2026

(54) SYSTEM FOR VEHICLE WHEELSPIN DETECTION AND CORRECTION

(71) Applicant: Textron Inc., Providence, RI (US)

(72) Inventors: Gregory August Theodosakis, Martinez, GA (US); Russell William King, Evans, GA (US); Matthew Jacob Noftsger, Evans, GA (US)

(73) Assignee: Textron Innovations Inc., Providence, RI (US)

( * ) Notice: Subject to any disclaimer, the term of this patent is extended or adjusted under 35 U.S.C. 154(b) by 113 days.

(21) Appl. No.: 18/443,094

(22) Filed: Feb. 15, 2024

(65) Prior Publication Data

US 2025/0262943 A1 Aug. 21, 2025

(51) Int. Cl.
*B60L 3/10* (2006.01)

(52) U.S. Cl.
CPC ............... *B60L 3/106* (2013.01); *B60L 3/104* (2013.01); *B60L 2240/14* (2013.01); *B60L 2260/42* (2013.01)

(58) Field of Classification Search
CPC ...... B60L 3/106; B60L 3/104; B60L 2240/14; B60L 2260/42
See application file for complete search history.

(56) References Cited

U.S. PATENT DOCUMENTS 4,982,348 A 1/1991 Matsuda et al.
5,208,754 A 5/1993 Nakaura et al.
5,307,274 A 4/1994 Takata et al.
5,425,574 A 6/1995 Sano
5,608,631 A 3/1997 Tsutsumi et al.
5,644,490 A 7/1997 Weber
6,182,002 B1 1/2001 Bauerle et al.
6,202,020 B1 3/2001 Kyrtsos
6,285,933 B1 9/2001 Kohler et al.
6,305,760 B1 10/2001 Otake
6,842,683 B2 1/2005 Kim
7,032,450 B2 4/2006 Lee et al.
7,274,985 B2 9/2007 Nagaya et al.
(Continued)

FOREIGN PATENT DOCUMENTS

CN 107117150 A 9/2017
CN 111775950 B 2/2022
(Continued)

*Primary Examiner* — Hussein Elchanti
(74) *Attorney, Agent, or Firm* — Avek IP, LLC

(57) ABSTRACT

A system for detecting and correcting wheelspin in a vehicle powered by a motor includes drive wheels driven by the motor and a motor controller in communication with the motor. In one embodiment, a vehicle acceleration from an inertial measurement unit (IMU) is compared to an estimated vehicle acceleration determined from an acceleration of the motor's rotor. If the estimated vehicle acceleration is greater than the IMU acceleration the motor controller adjusts the motor to correct the wheelspin. In a second embodiment, the vehicle acceleration is determined from a GPS receiver. In further embodiments, the vehicle acceleration is determined from other motor parameters, including voltage, current, and torque. In various embodiments, the drive motor is an electric motor, an internal combustion engine, or other prime mover device or mechanism.

13 Claims, 6 Drawing Sheets

(56) References Cited

U.S. PATENT DOCUMENTS

| | | | |
|---|---|---|---|
| 7,522,985 | B2 | 4/2009 | Fiedler et al. |
| 7,617,036 | B2 | 11/2009 | Tan et al. |
| 7,676,315 | B2 * | 3/2010 | Doering ................ F02P 5/1504 701/87 |
| 8,095,309 | B2 | 1/2012 | Ryu et al. |
| 8,200,374 | B2 | 6/2012 | Tan et al. |
| 8,423,258 | B2 | 4/2013 | Robinson et al. |
| 8,930,097 | B2 | 1/2015 | Vandekerhove et al. |
| 9,174,534 | B2 | 11/2015 | Gao et al. |
| 9,248,813 | B2 | 2/2016 | Harrison |
| 9,731,725 | B2 * | 8/2017 | Riedle ............... B60W 30/1882 |
| 9,903,308 | B2 | 2/2018 | Cornils et al. |
| 10,040,460 | B2 | 8/2018 | Kasaiezadeh et al. |
| 10,247,303 | B2 | 4/2019 | Nassouri et al. |
| 2004/0158368 | A1 | 8/2004 | Haas |
| 2008/0211434 | A1 * | 9/2008 | Daum ................... B60T 17/228 318/52 |
| 2009/0164060 | A1 | 6/2009 | Fortson et al. |
| 2011/0295457 | A1 | 12/2011 | Linda et al. |
| 2015/0039269 | A1 * | 2/2015 | Mejegard ................ H04W 4/80 702/182 |
| 2017/0334414 | A1 * | 11/2017 | Kumar .................... B60T 8/175 |
| 2019/0389473 | A1 | 12/2019 | Chen et al. |
| 2023/0035953 | A1 | 2/2023 | Oh et al. |
| 2023/0077116 | A1 | 3/2023 | Oh |
| 2023/0373494 | A1 * | 11/2023 | Phelan ................... G07C 5/008 |
| 2025/0262943 | A1 * | 8/2025 | Theodosakis ........... B60L 3/106 |

FOREIGN PATENT DOCUMENTS

| | | | |
|---|---|---|---|
| CN | 114655218 | A | 6/2022 |
| CN | 112937312 | B | 9/2022 |
| CN | 115107732 | A | 9/2022 |
| CN | 115431992 | A | 12/2022 |
| CN | 114715095 | B | 3/2023 |
| CN | 115973064 | A | 4/2023 |
| DE | 102008038465 | A1 | 4/2009 |
| DE | 10260416 | B4 | 2/2014 |
| DE | 102014225447 | A1 | 6/2016 |
| EP | 0126051 | B1 | 8/1988 |
| EP | 0445935 | A2 | 9/1991 |
| EP | 0499947 | B1 | 11/1994 |
| EP | 1147929 | B1 | 9/2005 |
| GB | 2381873 | B | 12/2003 |
| JP | H11326358 | A | 11/1999 |
| KR | 20150140958 | A | 12/2015 |
| KR | 102003336 | B1 | 7/2019 |
| WO | 2023088556 | A1 | 5/2023 |

* cited by examiner

SYSTEM FOR VEHICLE WHEELSPIN DETECTION AND CORRECTION

BACKGROUND

Field

This disclosure relates generally to the control of land operated vehicles. More specifically, this disclosure relates to systems and methods for the avoidance of wheelspin in vehicles.

Description of the Related Art

Safe and effective operation and control of land operated vehicles is an ongoing concern for vehicle operators, vehicles manufacturers, and governmental oversight and regulation organizations. Ongoing improvements to the operation of vehicle powertrain and drivetrain systems, and the components of those systems, provide enhanced vehicle safety in the form of more controllable and more predictable operation, as well as enhanced efficiency through minimizing inefficient operation of those systems and components. For example, the development of anti-lock braking systems for use in automobiles provided enhanced safety for vehicle operators, and those systems became ubiquitous in modern automobile manufacturing. Utilizing the wheel speed sensors required in the anti-lock braking systems, manufacturers further developed traction control systems which monitor wheel speeds of vehicles to detect potential slippage of drive wheels on the vehicle.

While such systems are useful, they are also complex and expensive to design, build, and maintain. And, while the costs of such systems can be easily absorbed into the price of full-size automobiles and trucks, smaller and lower cost consumer vehicles-such as golf cars, utility vehicles, and the like-typically forgo the added expense and complexity of wheel speed sensors and those associated antilock and traction control systems. However, many golf cars and utility vehicles have enough power to spin the drive wheels relative to the ground (especially on wet or loose ground surfaces) and potentially damage the ground or turf or otherwise diminish control of the vehicle. In order to address the problem many manufacturers of consumer vehicles limit the acceleration of the vehicle regardless of the ground conditions or decrease the sensitivity of the accelerator pedal to limit the potential for wheel spin. While these approaches are somewhat effective, such a one-size-fits-all approach imposes unnecessary limits on normal operation of the vehicle when conditions do not warrant such limitations, and do not necessarily prevent wheel spin under more severe conditions.

Thus, it can be seen that there remains a need in the art for improved control of consumer vehicles that provides added safety and efficiency without incurring the cost and complexity of systems known in the art.

SUMMARY

Embodiments of the invention are defined by the claims below, not this summary. A high-level overview of various aspects of the invention is provided here to introduce a selection of concepts that are further described in the detailed description section below. This summary is not intended to identify key features or essential features of the claimed subject matter, nor is it intended to be used in isolation to determine the scope of the claimed subject matter. In brief, this disclosure describes, among other things, systems and methods for detecting and preventing wheelspin in powered vehicles.

In one embodiment, an electric vehicle includes a powertrain comprising a motor controller in electrical communication with an electric motor and an inertial measurement unit (IMU). The electric motor is coupled to one or more wheels of the vehicle such that rotation of the rotor of the electric motor is translated to rotation of the drive wheel(s) to propel the vehicle. The motor controller is operable to control the electric motor to achieve a desired vehicle speed and to monitor the speed of the rotor of the motor (e.g., revolutions per minute (RPM)), as well as to monitor various other motor parameters, such as torque, voltage, current, and temperature. The IMU is attached to the vehicle and is in communication with the motor controller to provide vehicle acceleration, inclination, orientation, and angular rate information to the controller.

Based on measured RPM of the electric motor, control circuitry in the motor controller calculates a motor-RPM estimated vehicle acceleration and compares that motor-RPM estimated acceleration to a measured vehicle acceleration provided by the IMU. If the IMU-measured vehicle acceleration is less than the motor-RPM estimated vehicle acceleration, the control circuitry determines that wheel slippage is likely occurring and adjusts a parameter of the motor to compensate. For example, adjusting an angular acceleration or current through the motor may adjust the speed of the motor—i.e., decrease the motor rpm-until slippage no longer occurs.

In other embodiments the vehicle may employ an internal combustion engine or other prime mover mechanism, in which case the motor controller measures parameters of the engine and controls the engine's power to prevent or stop detected wheelspin.

In another embodiment, the electric vehicle includes a global positioning system (GPS) receiver, wherein the GPS receiver is operable to provide geographic location/position information to the control circuitry of the motor controller. The control circuitry calculates an estimated vehicle acceleration based on successive GPS position readings over a period of time. If the GPS-estimated vehicle acceleration is less than the motor-RPM estimated acceleration, the control circuitry determines that wheel slippage is likely occurring and adjusts the motor speed to compensate. In alternative embodiments, the GPS receiver itself may provide a signal indicative of acceleration directly to the motor controller rather than having the control circuitry calculate acceleration from GPS positional information. In further embodiments, the GPS receiver providing vehicle positional and/or acceleration information to the motor controller may also be integrated into a fleet management system used to track and locate vehicles.

In further embodiments, the motor controller may determine likely wheelspin based on measured electric motor parameters, such as motor shaft RPM, torque, or current, and correct or compensate by slowing the speed of the motor based on that motor-parameter estimated acceleration.

Thus, detection of wheelspin may be achieved by use of a motor controller and associated control circuitry in conjunction with an IMU, a GPS receiver, internal motor parameters, or combinations thereof, without the use of individual wheel speed detection sensors.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about", "approximately", or other terms of approximation as used herein denote deviations or changes from an exact value that are insignificant to the function.

Figure 1:
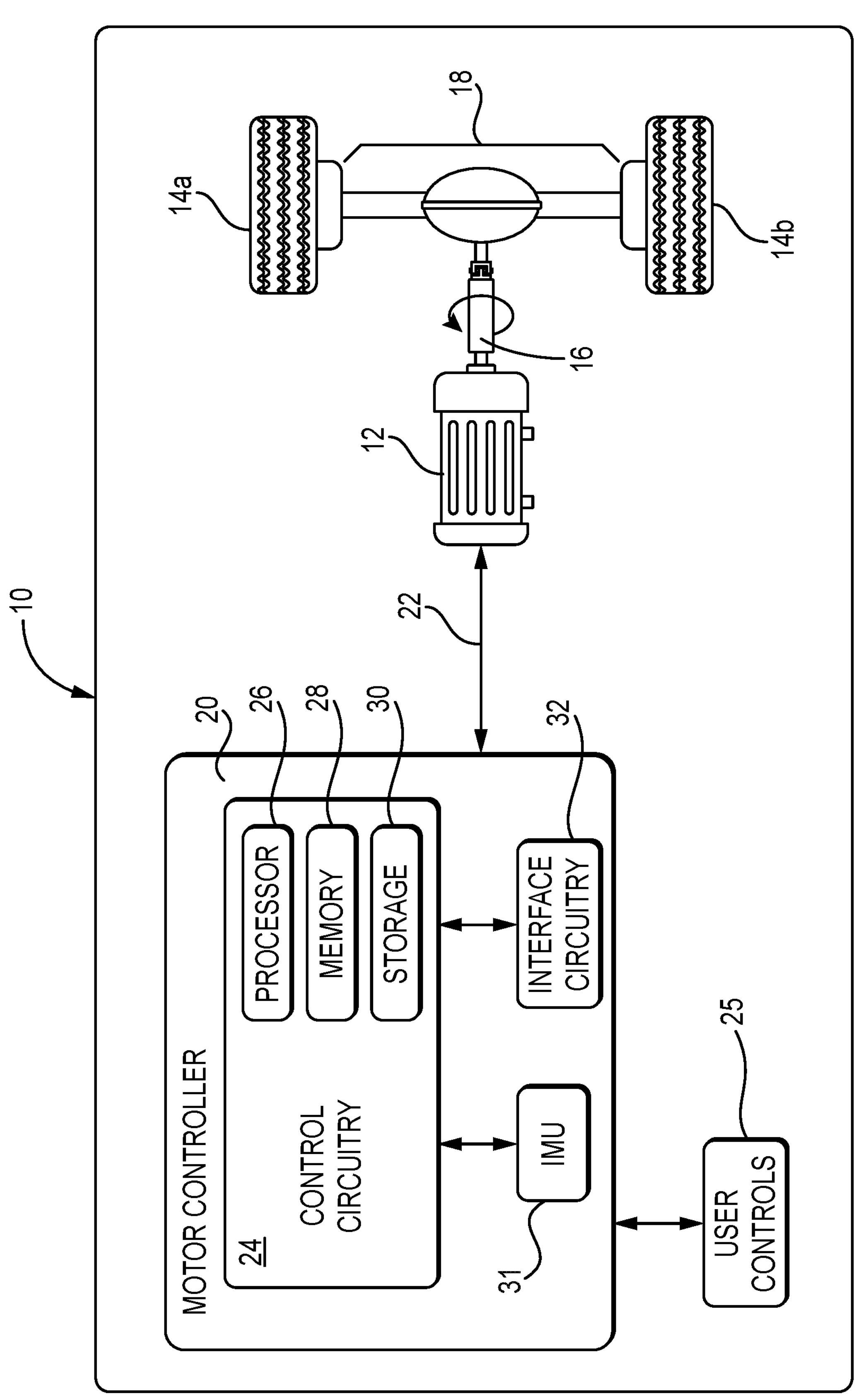
FIG. 1 is a schematic view of a wheelspin detection and correction system in accordance with a first exemplary embodiment of the present invention.

Looking first to FIG. 1, a system for wheelspin detection and correction in a vehicle in accordance with a first exemplary embodiment of the present invention is depicted generally by the numeral 10. The system comprises an electric motor 12 coupled to one or more drive wheels 14*a*, 14*b* of the vehicle such that rotation of the electric motor's rotor 16 is translated into rotation of the drive wheels 14*a*, 14*b* which are operable to propel the vehicle along the ground. The coupling 18 of the rotor 16 to the wheels 14*a*, 14*b* may be via a mechanical coupling such as a differential, gear box, transmission, and drive axles; via a hydraulic or hydrostatic drive system; by combinations of the previously described components; or by any other power transfer system or device as is known in the art operable to impart rotation of the drive wheels in response to rotation of the rotor of the electric motor.

The electric motor 12 is in electrical communication with a motor controller 20 via a power and communications link 22 which allows the motor controller 20 to regulate the power provided to the electric motor 12, to control the electric motor's speed and direction of rotation, and to monitor various parameters of the electric motor 12 and rotor 16, such as voltage, current, rotational speed (typically in revolutions-per-minute (RPM)), torque, and temperature.

The motor controller 20 also receives input from various user controls 25 on the vehicle, such as an accelerator pedal and direction control switch, which allow a user to input and vary or control the desired acceleration, speed, and direction of travel (i.e., forward or reverse) of the vehicle.

Control circuitry 24 in the motor controller may include processors 26, memory 28, and storage 30 that enable the motor controller 20 to execute instructions to perform various measurements, calculations, and control functions. Interface circuitry 32 allows the motor controller 20 to monitor input signals and to control output signals. For example, depending on the type of motor used, the motor controller 20 may control the speed of the electric motor 12 by varying voltage and/or current supplied to the motor, by varying the pulse width of a pulse-width modulated (PWM) signal to the motor, or by supplying an analog or digital control signal to the motor indicative of a desired speed of the motor. In some embodiments, the motor controller 20 may directly supply power to the motor via the power and communications link 22, in other embodiments the power may be supplied directly to the motor 12 with the motor controller 20 providing a control signal commanding and controlling the desired power to the motor. In some embodiments the control circuitry 24 may include predetermined and variable parameters to apply limits, overrides, or schedules to the user input. For example, the control circuitry 24 may limit the acceleration of the electric motor 12 (and thus of the vehicle) in achieving a desired speed, may limit power to the motor upon detection of an over-voltage, over-current, over-torque, or other out-of-range condition, or may limit the maximum speed of the motor.

An inertial measurement unit (IMU) 30 attached or mounted to the vehicle is in communication with the motor controller 20 and provides vehicle movement and/or orientation information-such as acceleration, specific force, angular rate, and/or orientation—to the motor controller from which the control circuitry can determine, among other things, a longitudinal acceleration rate of the vehicle. In some embodiments, the IMU 31 may be mounted separately from the motor controller, in other embodiments the IMU 31 may mounted in or on the motor controller, in other embodiments the IMU 31 may be integrated into the motor controller 20 and/or control circuitry 24.

Thus, the motor controller 20 accepts inputs from user controls 25 which indicate user-desired operation of the vehicle, e.g., a desired speed and acceleration indicated by a movement/depression of an accelerator pedal, and a desired direction of travel (forward or reverse) of the vehicle indicated by a position of a direction switch. The control circuitry may limit or adjust those desired user-defined limits or inputs based on predetermined limits or schedules, then provides control and/or power signals to the motor to achieve the desired results—e.g., a direction and speed of the vehicle.

Furthermore, as will now be discussed in more detail, actual vehicle acceleration information from the IMU 31 may be compared to an estimated acceleration calculated by the motor controller 20 based on movement (i.e., acceleration and rotational speed) of the motor rotor 16 to determine whether any wheelspin or slippage is occurring. If so, the motor controller may correct the power and/or control signal to the motor to decrease the speed of the motor until no wheelspin is detected. The motor controller may further, once any wheelspin has ceased, resume increasing the speed of the motor to achieve the user's desired vehicle speed while continuing to monitor for further wheelspin.

Looking still to FIG. 1, as discussed above, IMU 31 is attached to the vehicle and provides an IMU-measured acceleration signal to the motor controller 20 indicative of the actual acceleration of the vehicle. Simultaneously, the control circuitry 24 of the motor controller 20 monitors parameters of the electric motor 12, including the speed and acceleration of the rotor 16 of the motor.

For example, the relationship between the rotational speed of the motor and the linear speed of the vehicle can be expressed as:

$$\frac{RPM}{\text{ft/sec}} = \frac{\text{axle ratio} \times 12 \text{ in/ft} \times 60 \text{ sec/min}}{2\pi \times \text{rolling radius}}$$

With an axle ratio of 16.99 and a rolling radius of 11.11 in, the speed to RPM ratio is:

$$\frac{RPM}{\text{ft/sec}} = \frac{16.99 \times 12 \text{ in/ft} \times 60 \text{ sec/min}}{2\pi \times 11.11 \text{ in}} = 175.2$$

Thus, for every 175.2 RPM of the motor, the vehicle will travel 1 ft/sec.

The controller can estimate the vehicle's linear acceleration in units of ft/sec$^2$ through the following formula:

$$a_{est} = \frac{RPM_f - RPM_i}{\Delta t} \times \frac{1}{175.2}$$

The IMU measures acceleration in g (i.e., 32.17 ft/sec$^2$). Therefore, the controller can perform a plausibility check on the estimated acceleration rate compared to the measured acceleration rate:

$$32.17 \times a_{est} \overset{?}{>>} a_{IMU}$$

If the controller determines the estimated vehicle linear acceleration, calculated as a function of motor RPM, greatly exceeds that acceleration measured by the IMU, the controller can assume that the tires are slipping (wheelspin) and augment motor control accordingly.

Thus, knowing the size/diameter of the drive wheels 14*a*, 14*b*, and the gear or mechanical ratio of the coupling 18 between the rotor 16 and the drive wheels, the control circuitry can determine an estimated acceleration of the vehicle based on the rotational acceleration of the rotor 16. Preferably, the relationship between rotation of the motor's rotor 16 and the corresponding movement of the drive wheels 14*a*, 14*b* is predetermined and stored in the control circuitry upon manufacture or delivery of the vehicle. In some embodiments, the relationship is user definable and/or changeable to accommodate, for example, changes in the size of wheels or tires on the vehicle. Thus, based on the motor rotor 16 RPM the motor controller 20 can determine a motor-estimated acceleration of the vehicle and compare it to the IMU-measured acceleration of the vehicle. If the IMU-measured acceleration is less than the motor-estimated acceleration, then it can be determined that there is wheelspin (i.e., the actual vehicle acceleration is less than what would be expected based on the speed and acceleration of the motor rotor) and the motor controller 20 may decrease the power or control signal to the motor to decrease the motor's speed until there is no further detected wheelspin.

It should be understood that while the described embodiment refers to measurement of the RPM of the rotor 16, in alternative embodiments the actual measurement of the rotor speed may be measured (or derived from) measurement of the speed of other components or devices downstream of the rotor itself. For example, if the rotor drives a gearbox having a 2:1 ratio between its input and output (i.e., 2 revolutions of the input to the gearbox results in 1 revolution of the output of the gearbox), then measurement of the gearbox output allows calculation or derivation of the motor rotor RPM. Thus, in some embodiments, a measured acceleration of a rotor of the electric motor may be obtained by measuring an acceleration of a component in mechanical communication with the rotor calculating or deriving an acceleration of the rotor based thereon such that in those embodiments a measurement of the speed of other components may be used instead of direct measurement of the rotor 16 RPM.

Figure 2:
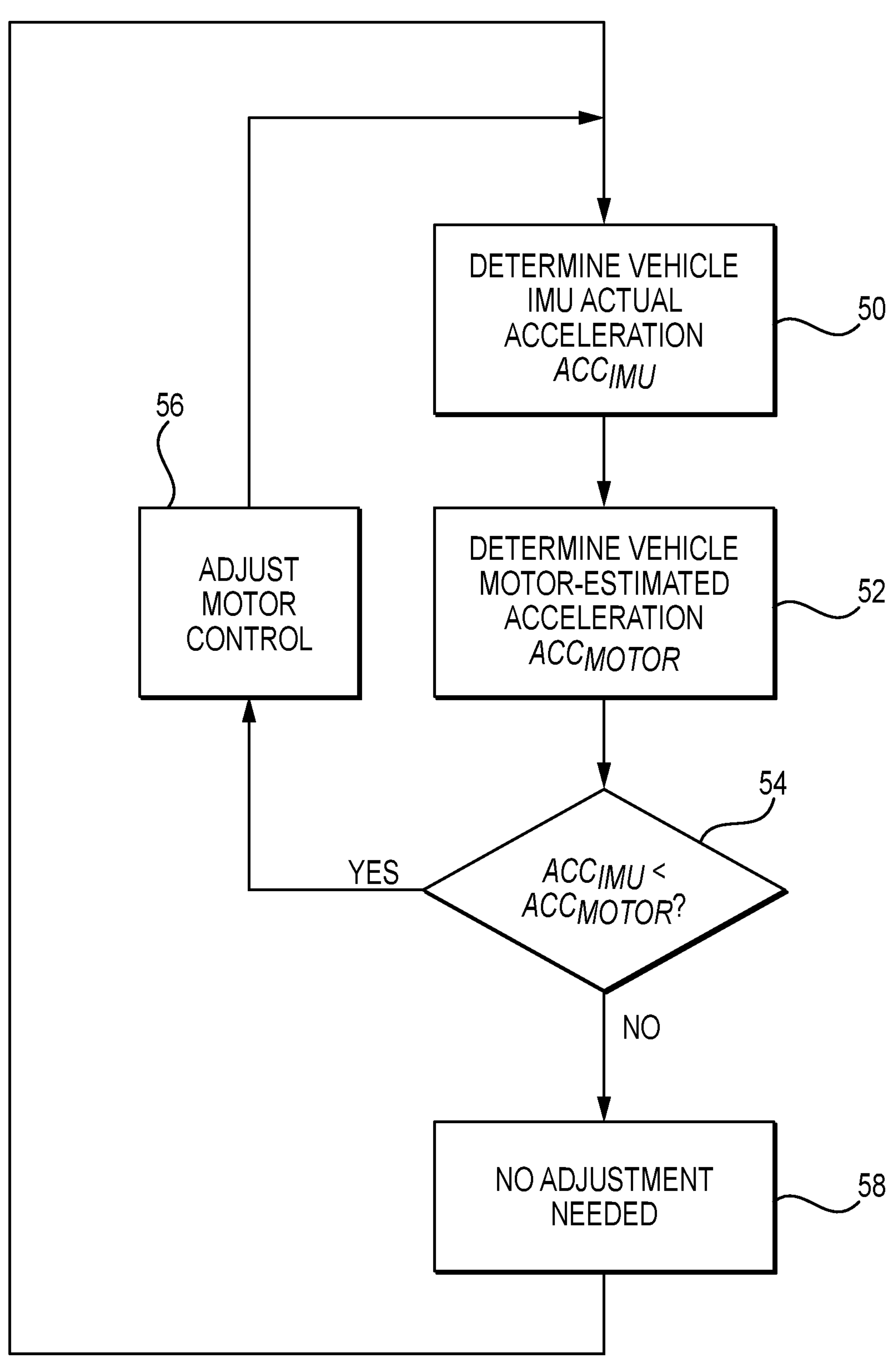
FIG. 2 is a logic flow diagram of the wheelspin detection and correction system of FIG. 1.

Turning to FIG. 2, a flow diagram of the logic employed in the system as just described is depicted. At block 50, the actual acceleration of the vehicle is determined by the IMU and that value is provided to the motor controller. At block 52, a motor-rotor estimated vehicle acceleration is determined by the control circuitry of the motor controller based on measured motor parameters such as motor shaft speed and acceleration.

At block 54, the actual vehicle acceleration as measured by the IMU ($ACC_{IMU}$) is compared to the estimated vehicle acceleration based on measurement of the motor-rotor acceleration ($ACC_{motor}$). If $ACC_{IMU}$ is less than $ACC_{motor}$ then the motor controller determines that there is wheelspin and at block 56 the motor controller adjusts the motor speed by decreasing power to the motor by adjusting the power or control signal to the motor as discussed above, and the determination of acceleration is repeated starting at block 50.

If, at block 54 $ACC_{IMU}$ is not less than $ACC_{motor}$ then at block 58 the motor controller determines that no adjustment to the motor speed is required and the acceleration monitoring process is repeated beginning at block 50. In some embodiments, at block 54 the difference between $ACC_{IMU}$ and $ACC_{motor}$ must exceed a predetermined threshold in order for the motor controller to make a determination of wheelspin.

Thus, as just described, the system of the present invention in this first exemplary embodiment detects wheelspin by comparing the actual vehicle acceleration as measured by the IMU ($ACC_{IMU}$) to an estimated vehicle acceleration ($ACC_{motor}$) as measured and/or calculated by the control circuitry based on monitored motor parameters and corrects the wheelspin by decreasing power to the electric motor until no further wheelspin is detected.

Figure 3:
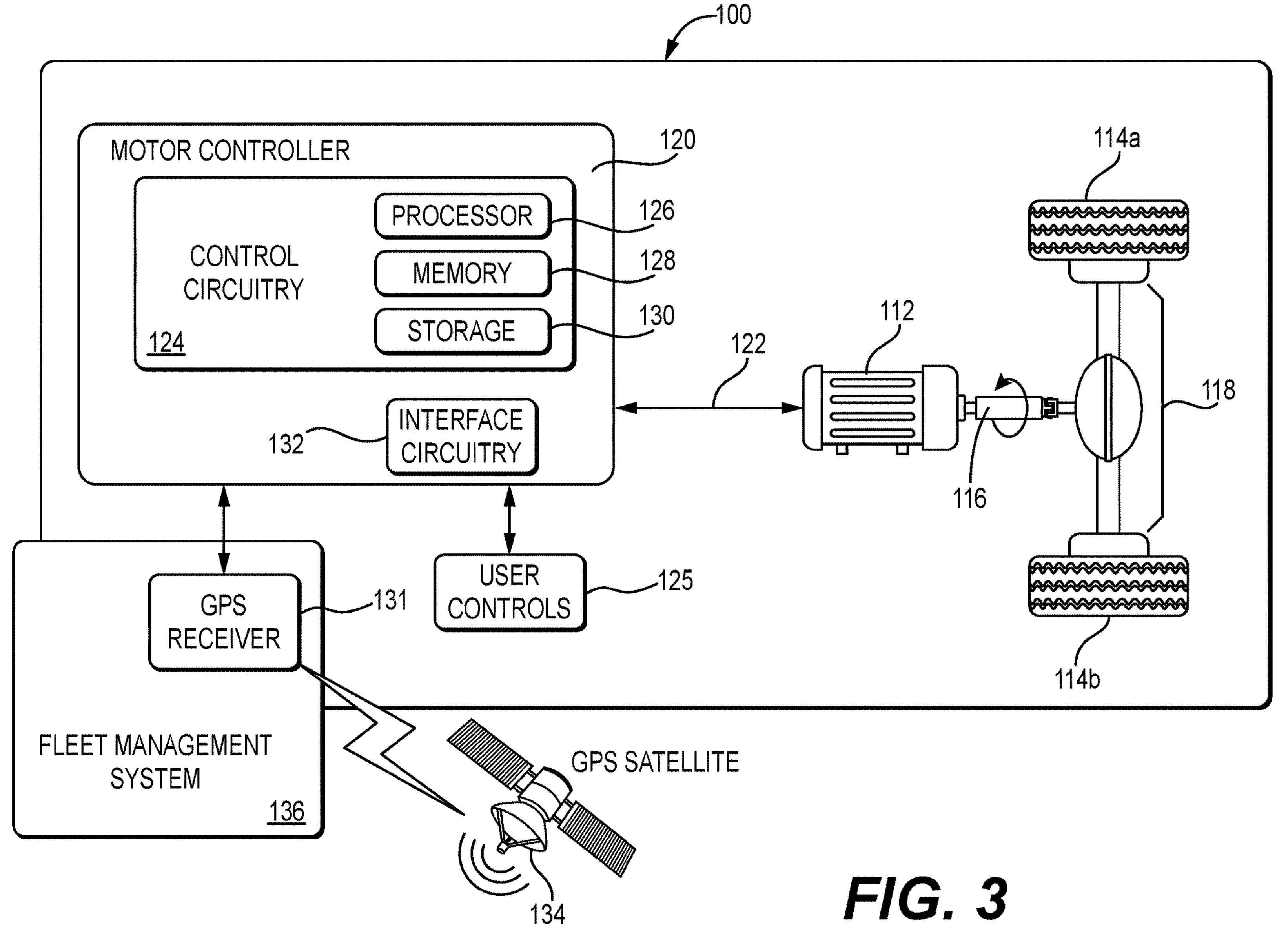
FIG. 3 is a schematic view of a wheelspin detection and correction system in accordance with a second exemplary embodiment of the present invention.

Turning to FIG. 3, a system for wheelspin detection and correction in a vehicle in accordance with a second exemplary embodiment of the present invention is depicted generally by the numeral 100. As in the system of the first exemplary embodiment as described above, in this second exemplary embodiment the system comprises an electric motor 112 coupled to drive wheels 114*a*, 114*b* of the vehicle such that rotation of the electric motor's rotor 116 is translated into rotation of the drive wheels 114*a*, 114*b* to propel the vehicle along the ground. The coupling 118 of the rotor 116 to the wheels 114*a*, 114*b* may be via a mechanical coupling such as a differential, gear box, transmission, and drive axles; via a hydraulic or hydrostatic drive system; by combinations of the previously described components; or by any other power transfer system or device as is known in the art.

The electric motor 112 is in electrical communication with a motor controller 120 via a power and communications link 122 which allows the motor controller 120 to regulate the power provided to the electric motor 112, to control the electric motor's speed and direction of rotation, and to monitor various parameters of the electric motor 112 and rotor 116, such as voltage, current, rotational speed (typically in revolutions-per-minute (RPM)), torque, and temperature.

The motor controller 120 also receives input from various user-operated controls 125 on the vehicle, such as an accelerator pedal and direction control switch, which allow a user to input and vary or control the desired acceleration, speed, and direction of travel (i.e., forward or reverse) of the vehicle.

Control circuitry 124 in the motor controller may include processors 126, memory 128, and non-transitory storage 130 that enable the motor controller 120 to execute instructions stored in the memory 128 and/or non-transitory storage 130 to perform various measurements, calculations, and control functions. Interface circuitry 132 allows the motor controller 120 to monitor input signals and to control output signals. For example, depending on the type of motor used, the motor controller 120 may control the speed of the electric motor 112 by varying voltage and/or current supplied to the motor, by varying the pulse width of a pulse-width modulated (PWM) signal to the motor, or by supplying an analog or digital control signal to the motor indicative of a desired speed of the motor. In some embodiments, the motor controller 120 may directly supply power to the motor via the power and communications link 122, in other embodiments the power may be supplied directly to the motor 112 with the motor controller 120 providing a control signal commanding and controlling the desired power to the motor. In some embodiments the control circuitry 124 may include predetermined and variable parameters to apply limits, overrides, or schedules to the user input to impart control to the electric motor. For example, the control circuitry 124 may limit the acceleration of the electric motor 112 (and thus of the vehicle) in achieving a desired speed, may limit power to the motor upon detection of an over-voltage, over-current, over-torque, or other out-of-range condition, or may limit the maximum speed of the motor.

A global positioning system (GPS) receiver 131 mounted to the vehicle is in communication with a GPS satellite 134 and with the motor controller 120 and is operable to provide geographic location/position information to the control circuitry 124 of the motor controller 120. In one embodiment, the control circuitry calculates an estimated vehicle acceleration ($ACC_{GPS}$) based on successive GPS position readings over a period of time. In alternative embodiments, the GPS receiver 131 itself may internally calculate an estimated acceleration and provide a signal indicative of that estimated vehicle acceleration ($ACC_{GPS}$) directly to the motor controller 120 rather than the control circuitry calculating estimated acceleration from GPS positional information. In further embodiments, the GPS receiver 131 providing vehicle positional and/or acceleration information to the motor controller is integrated into a fleet management system 136 that may be separately used to track and locate vehicles.

Thus, as in the first embodiment as described above, the motor controller 120 accepts inputs from user controls 125 which indicate user-desired operation of the vehicle, e.g., a desired speed and acceleration indicated by a movement/depression of an accelerator pedal, and a desired direction of travel (forward or reverse) of the vehicle indicated by a position of a direction switch. The control circuitry may limit or adjust those desired user inputs based on predetermined limits or schedules, then provides control and/or power signals to the motor to achieve the desired results—e.g., a direction and speed of the vehicle.

Furthermore, an estimated vehicle acceleration ($ACC_{GPS}$) from the GPS receiver 131 may be compared to an estimated acceleration calculated by the motor controller 120 based on movement of the motor rotor 116 (i.e., acceleration and rotational speed) to determine whether any wheelspin or slippage is occurring. If so, the motor controller may correct the power and/or control signal to the motor to decrease the speed of the motor until no wheelspin is detected. The motor controller may further, once any wheelspin has ceased, resume increasing the speed of the motor to achieve the user's desired vehicle speed while continuing to monitor for further wheelspin.

Looking still to FIG. 3, the GPS receiver 131 is attached to the vehicle and provides a GPS-estimated acceleration signal ($ACC_{GPS}$) to the motor controller 120 indicative of an acceleration of the vehicle. Simultaneously, the control circuitry 124 of the motor controller 120 monitors parameters of the electric motor 12, including the speed and acceleration of the rotor 116 of the motor.

As discussed previously, knowing the size of the drive wheels 114*a*, 114*b*, and the gear or mechanical ratio of the coupling 118 between the rotor 116 and the drive wheels, the control circuitry can determine an estimated acceleration of the vehicle based on the rotational acceleration of the rotor 116 of the motor. Preferably, the relationship between rotation of the motor's rotor 116 and the corresponding movement of the drive wheels 114*a*, 114*b* is predetermined and stored in the control circuitry upon manufacture or delivery of the vehicle. In some embodiments, the relationship is user definable and/or changeable to accommodate, for example, changes in the size of wheels or tires on the vehicle. Thus, based on the motor rotor 116 RPM the motor controller 220 can determine a motor-estimated acceleration of the vehicle and compare it to the GPS-estimated acceleration of the vehicle. If the GPS-estimated acceleration is less than the motor-estimated acceleration, then it can be determined that there is wheelspin (i.e., the GPS-estimated vehicle acceleration is less than what would be expected based on the speed and acceleration of the motor rotor) and the motor controller 120 may decrease the power or control signal to the motor to decrease the motor's speed until there is no further detected wheelspin.

Figure 4:
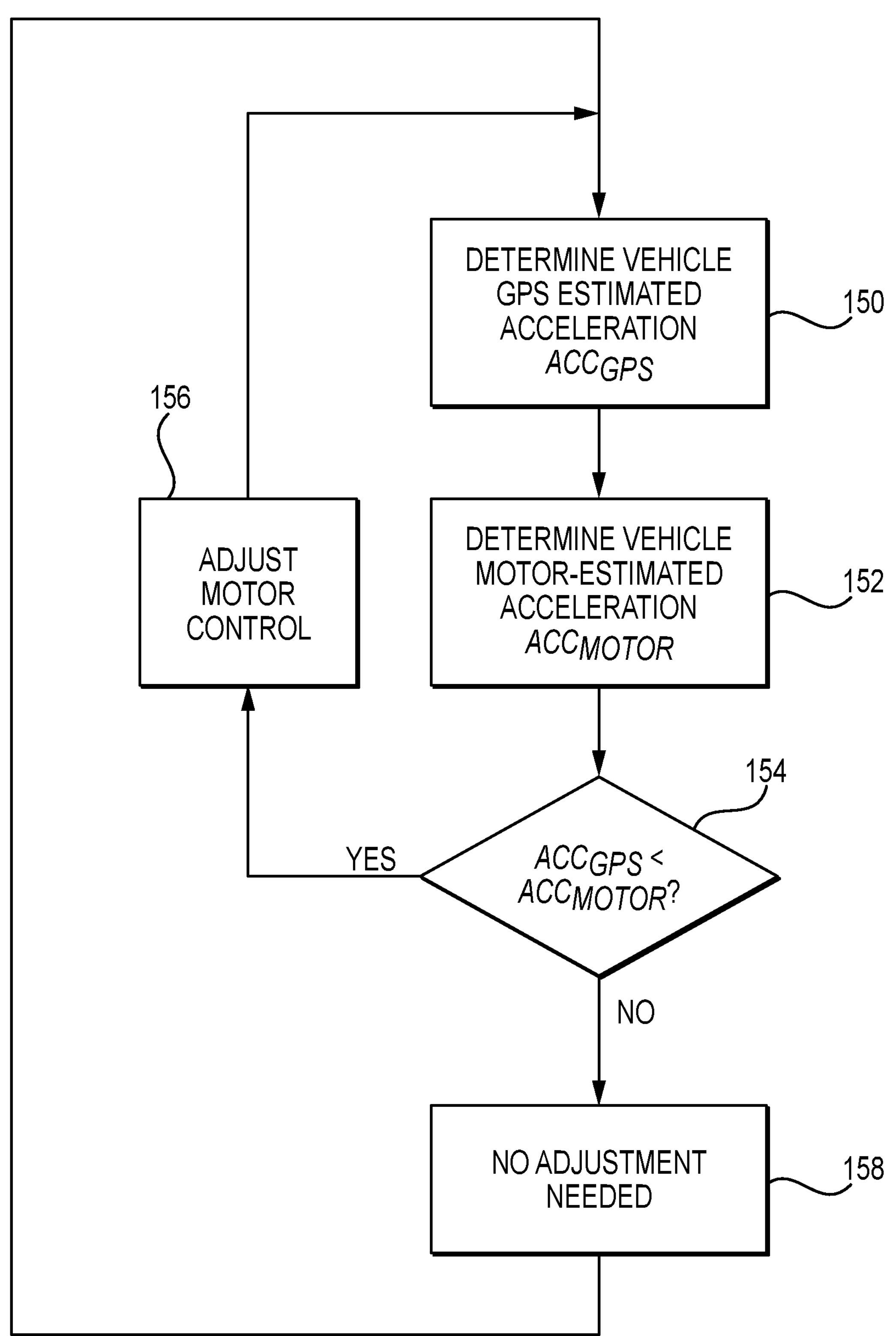
FIG. 4 is a logic flow diagram of the wheelspin detection and correction system of FIG. 3.

Turning to FIG. 4, a flow diagram of the logic employed in the embodiment as just described is depicted. At block 150, an estimated acceleration ($ACC_{GPS}$) of the vehicle is determined based on information provided by the GPS receiver 131 and that value is provided to the motor controller. At block 152, an estimated vehicle acceleration ($ACC_{motor}$) is determined by the control circuitry of the motor controller based on measured motor parameters such as motor shaft speed and acceleration.

At block 154, the GPS-estimated vehicle acceleration ($ACC_{GPS}$) is compared to the estimated vehicle acceleration based on measurement of the motor-rotor acceleration ($ACC_{motor}$). If $ACC_{GPS}$ is less than $ACC_{motor}$ then the motor controller determines that there is wheelspin and at block 156 the motor controller adjusts the motor speed by decreasing power to the motor by adjusting the power or control signal to the motor as discussed above, and the determination of acceleration is repeated starting at block 150.

If, at block 154 $ACC_{GPS}$ is not less than $ACC_{motor}$ then at block 158 the motor controller determines that no adjustment to the motor speed is required and the acceleration monitoring process is repeated beginning at block 150. In some embodiments, at block 154 the difference between $ACC_{GPS}$ and $ACC_{motor}$ must exceed a predetermined threshold in order for the motor controller to make a determination of wheelspin.

Thus, as just described, the system of the present invention in this second exemplary embodiment detects wheelspin by comparing the estimated vehicle acceleration based on GPS information ($ACC_{GPS}$) to an estimated vehicle acceleration ($ACC_{motor}$) as measured and/or calculated by the control circuitry based on monitored motor parameters and corrects the wheelspin by decreasing power to the electric motor until no further wheelspin is detected.

Figure 5:
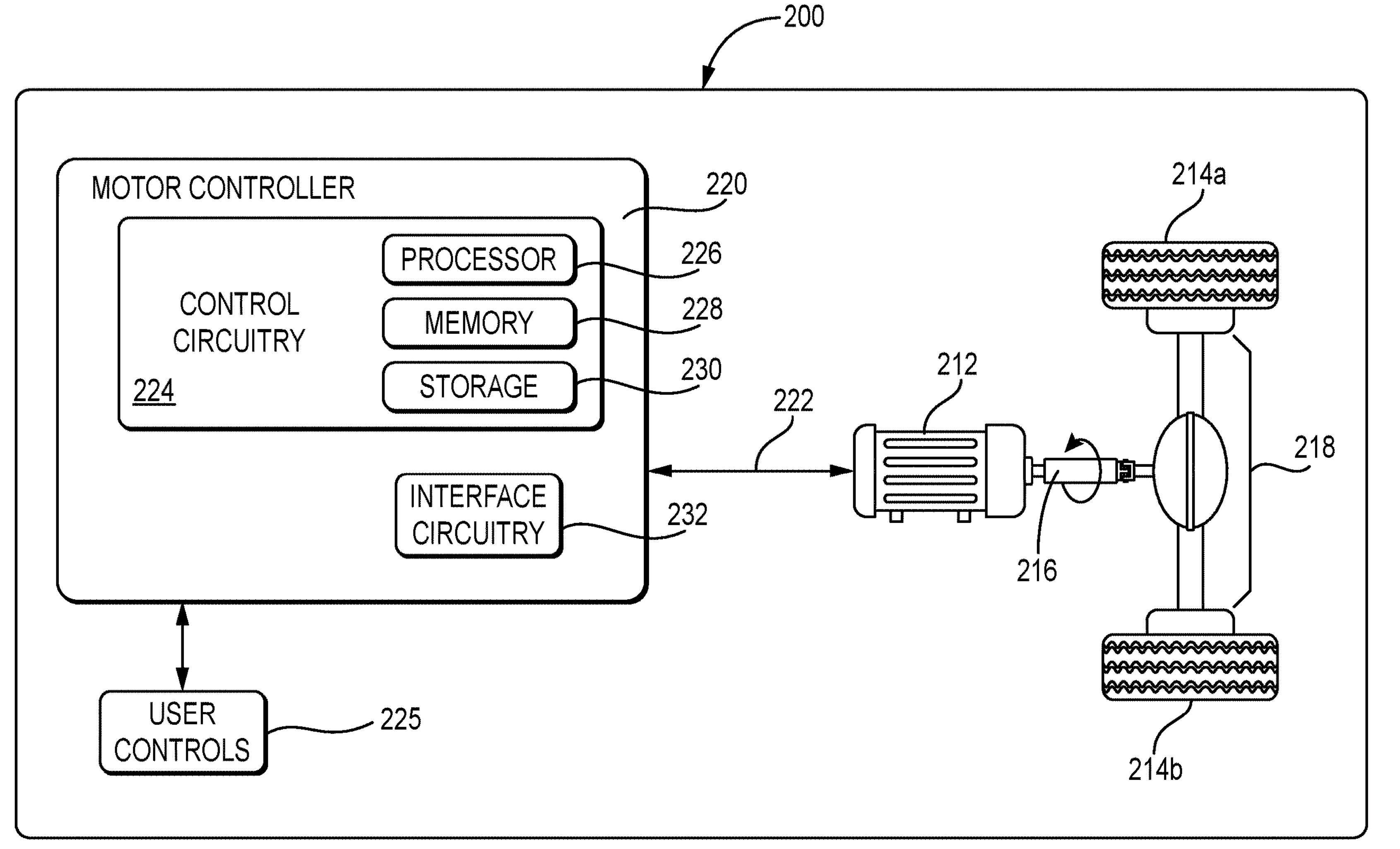
FIG. 5 is a schematic view of a wheelspin detection and correction system in accordance with a third exemplary embodiment of the present invention.

Turning to FIG. 5, a system for wheelspin detection and correction in a vehicle in accordance with a third exemplary embodiment of the present invention is depicted generally by the numeral 200. As in the system of the first and second exemplary embodiments as described above, in this exemplary embodiment the system comprises an electric motor 212 with a rotor 216 coupled to drive wheels 214*a*, 214*b* of the vehicle via a coupling 218 such that rotation of the electric motor's rotor 216 is translated into rotation of the drive wheels 214*a*, 214*b* to propel the vehicle along the ground The electric motor 212 is in electrical communication with a motor controller 220 via a power and communications link 222 which allows the motor controller 220 to regulate the power provided to the electric motor 212, to control the electric motor's speed and direction of rotation, and to monitor various parameters of the electric motor 212 and rotor 216, such as voltage, current, rotational speed (typically in revolutions-per-minute (RPM)), torque, and temperature. The motor controller 220 also receives input from various user-operated controls 225 on the vehicle as described previously such as an accelerator pedal and direction control switch, which allow a user to input and vary or control the desired acceleration, speed, and direction of travel (i.e., forward or reverse) of the vehicle.

Control circuitry 224 in the motor controller may include processors 226, memory 228, and storage 230 that enable the motor controller 220 to execute instructions to perform various measurements, calculations, and control functions. Interface circuitry 232 allows the motor controller 220 to monitor input signals and to control output signals as described previously.

In this embodiment, with no IMU or GPS receiver, the control circuitry 224 calculates first and second estimated vehicle accelerations based on measurements of different motor parameters, such as RPM, voltage, current, or torque.

Thus, the control circuitry may determine and/or calculate a first estimated vehicle acceleration from measured motor voltage, current, torque, or combinations thereof. Simultaneously, as described previously the control circuitry may determine a second estimated acceleration of the vehicle based on the rotational acceleration of the rotor 216 of the motor.

If the first estimated acceleration is less than the second estimated acceleration, then it can be determined that there is wheelspin (i.e., the first estimated vehicle acceleration is less than what would be expected based on the speed and acceleration of the motor-rotor used to determine the second estimated vehicle acceleration) and the motor controller 220 may decrease the power or control signal to the motor to decrease the motor's speed until there is no further detected wheelspin.

Figure 6:
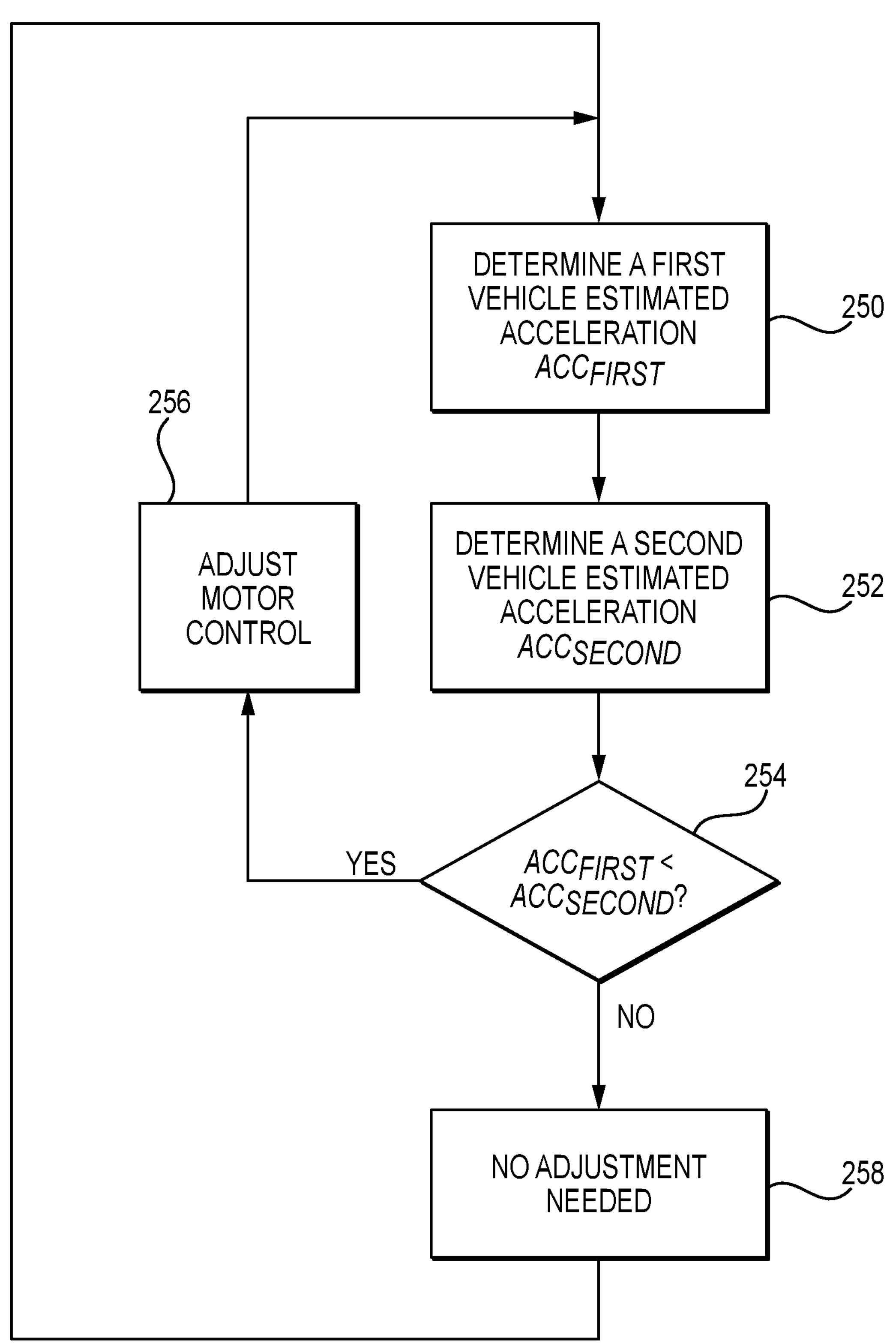
FIG. 6 is a logic flow diagram of the wheelspin detection and correction system of FIG. 5.

Turning to FIG. 6, a flow diagram of the logic employed in the embodiment as just described is depicted. At block 250, a first estimated acceleration ($ACC_{first}$) of the vehicle is determined based on motor parameters such as voltage, current, torque, or combinations thereof. At block 252, an estimated vehicle acceleration ($ACC_{second}$) is determined by the control circuitry of the motor controller based on measured motor shaft speed and acceleration.

At block 254, the first-estimated vehicle acceleration ($AC_{first}$) is compared to the estimated vehicle acceleration based on measurement of the motor-rotor acceleration ($ACC_{second}$). If $ACC_{first}$ is less than $ACC_{second}$ then the motor controller determines that there is wheelspin and at block 256 the motor controller adjusts the motor speed by decreasing power to the motor by adjusting the power or control signal to the motor as discussed above, and the determination of acceleration is repeated starting at block 250.

If, at block 254 $ACC_{first}$ is not less than $ACC_{second}$ then at block 258 the motor controller determines that no adjustment to the motor speed is required and the acceleration monitoring process is repeated beginning at block 250. In some embodiments, at block 254 the difference between $ACC_{first}$ and $ACC_{second}$ must exceed a predetermined threshold in order for the motor controller to make a determination of wheelspin.

Thus, as just described, the system of the present invention in this third exemplary embodiment detects wheelspin by comparing a first estimated vehicle acceleration based on motor voltage, current, or torque to a second estimated vehicle acceleration ($ACC_{second}$) as measured and/or calculated by the control circuitry based on monitored motor rotor RPM and acceleration and corrects the wheelspin by decreasing power to the electric motor until no further wheelspin is detected.

As described herein, the claimed invention is well-suited for use with electrically powered vehicles employing an electric motor. It should be understood that the invention may likewise be used in conjunction with a vehicle having a non-electric motor—such as an internal combustion engine—wherein the motor controller monitors engine parameters, such as RPM, torque and adjusts power to the engine to prevent detected wheelspin in a manner similar to that described herein with respect to the electric motor, or any other prime mover device or mechanism configured to impart movement to the drive wheel(s) of a vehicle. For example, the motor controller may command less fuel to the engine (e.g., through control of fuel injectors, throttle body, etc.) in response to detected wheelspin. These and other variations are contemplated by and are within the scope of the present invention.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for detecting and correcting wheelspin in an electric vehicle, comprising:

an electric motor having a rotor coupled to one or more drive wheels, the one or more drive wheels operable to propel the electric vehicle in response to rotation of the rotor of the electric motor;

an inertial measurement unit (IMU) attached to the electric vehicle and operable to provide an IMU-measured vehicle acceleration; and a motor controller comprising control circuitry in communication with the electric motor and IMU, wherein the motor controller:

determines a vehicle acceleration based on information received from the IMU;

determines a motor-rotor estimated vehicle acceleration based on a measured acceleration of a rotor of the electric motor; and detects wheelspin by determining if the IMU-measured vehicle acceleration is less than the motor-rotor estimated vehicle acceleration, wherein upon detection of wheelspin the motor controller decreases power to the electric motor until a cessation of wheelspin is detected.

2. The system of claim 1, wherein decreasing power to the electric motor comprises adjusting a voltage, a current, or a command signal to the electric motor.

3. A system for detecting and correcting wheelspin in an electric vehicle, comprising:

an electric motor having a rotor coupled to one or more drive wheels, the one or more drive wheels operable to propel the electric vehicle in response to rotation of the rotor of the electric motor;

an inertial measurement unit (IMU) attached to the electric vehicle and operable to provide an IMU-measured vehicle acceleration;

a motor controller comprising control circuitry in communication with the electric motor and IMU, wherein the motor controller:

(i) determines a vehicle acceleration based on information received from the IMU;

(ii) determines a motor-rotor estimated vehicle acceleration based on a measured acceleration of a rotor of the electric motor;

(iii) detects wheelspin by determining if the IMU-measured vehicle acceleration is less than the motor-rotor estimated vehicle acceleration; and the system further comprising user controls in communication with the motor controller operable to provide user-desired speed, acceleration, and direction information to the motor controller.

4. The system of claim 1, wherein the control circuitry comprises a processor, a memory, and non-transitory storage and is operable to execute instructions to perform desired control of the electric motor.

5. The system of claim 4, wherein the non-transitory storage includes predetermined and user-defined limits and schedules used to impart control to the electric motor.

6. The system of claim 1, wherein a measured acceleration of a rotor of the electric motor comprises measuring an acceleration of a component in mechanical communication with the rotor and a calculation or derivation of an acceleration of the rotor based thereon.

7. A system for detecting and correcting wheelspin in an electric vehicle, comprising:

an electric motor having a rotor coupled to one or more drive wheels, the one or more drive wheels operable to propel the electric vehicle in response to rotation of the rotor of the electric motor;

a global positioning system (GPS) receiver attached to the electric vehicle and operable to provide geographic positional and/or acceleration information; and a motor controller comprising control circuitry in communication with the electric motor and GPS receiver, wherein the motor controller:

determines a GPS-estimated vehicle acceleration based on information received from the GPS receiver;

determines a motor-rotor estimated vehicle acceleration based on a measured acceleration of a rotor of the electric motor; and detects wheelspin by determining if the GPS-estimated vehicle acceleration is less than the motor-rotor estimated vehicle acceleration, wherein upon detection of wheelspin the motor controller decreases power to the electric motor until no wheelspin is detected.

8. The system of claim 7, wherein decreasing power to the electric motor comprises adjusting a voltage, a current, or a command signal to the electric motor.

9. A system for detecting and correcting wheelspin in an electric vehicle, comprising:

an electric motor having a rotor coupled to one or more drive wheels, the one or more drive wheels operable to propel the electric vehicle in response to rotation of the rotor of the electric motor;

a global positioning system (GPS) receiver attached to the electric vehicle and operable to provide geographic positional and/or acceleration information; and a motor controller comprising control circuitry in communication with the electric motor and GPS receiver, wherein the motor controller:

(i) determines a GPS-estimated vehicle acceleration based on information received from the GPS receiver;

(ii) determines a motor-rotor estimated vehicle acceleration based on a measured acceleration of a rotor of the electric motor;

iii) detects wheelspin by determining if the GPS-estimated vehicle acceleration is less than the motor-rotor estimated vehicle acceleration; and the system further comprising user controls in communication with the motor controller operable to provide user-desired speed, acceleration, and direction information to the motor controller.

10. The system of claim 7, wherein the control circuitry comprises a processor, a memory, and non-transitory storage and is operable to execute instructions to perform desired control of the electric motor.

11. The system of claim 10, wherein the non-transitory storage includes predetermined and user-defined limits and schedules used to impart control to the electric motor.

12. A system for detecting and correcting wheelspin in a vehicle, comprising:

a drive motor coupled to a drive wheel, wherein the drive wheel is operable to propel the vehicle in response to a movement of the motor;

an inertial measurement unit (IMU) attached to the vehicle and operable to provide an IMU-measured vehicle acceleration; and a motor controller comprising control circuitry in communication with the motor and IMU, wherein the motor controller:

determines a vehicle acceleration based on information received from the IMU;

determines a motor estimated vehicle acceleration based on a measured acceleration of a component of the motor; and detects wheelspin by determining if the IMU-measured vehicle acceleration is less than the motor estimated vehicle acceleration, wherein upon detection of wheelspin the motor controller decreases power to the motor until a cessation of wheelspin is detected.

13. The system of claim 12, wherein the drive motor is an electric motor, an internal combustion engine, or other prime mover device or mechanism.

* * * * *